United States Patent
Hou et al.

(10) Patent No.: US 12,519,656 B2
(45) Date of Patent: Jan. 6, 2026

(54) COMPUTING DEVICES AND TRUSTED COMPUTING NODES FOR IMPROVING CREDIBILITY OF TRUSTED PLATFORM CONTROL MODULE

(71) Applicant: Alipay (Hangzhou) Information Technology Co., Ltd., Hangzhou (CN)

(72) Inventors: Weixing Hou, Hangzhou (CN); Peng Wu, Hangzhou (CN); Fengyun Shuai, Hangzhou (CN); Chao Li, Hangzhou (CN); Hailin Luo, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 140 days.

(21) Appl. No.: 18/565,444

(22) PCT Filed: Jun. 30, 2022

(86) PCT No.: PCT/CN2022/102919
§ 371 (c)(1),
(2) Date: Nov. 29, 2023

(87) PCT Pub. No.: WO2023/005589
PCT Pub. Date: Feb. 2, 2023

(65) Prior Publication Data
US 2024/0259216 A1 Aug. 1, 2024

(30) Foreign Application Priority Data
Jul. 30, 2021 (CN) .......................... 202110876068.6

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/3236* (2013.01); *H04L 9/3263* (2013.01)

(58) Field of Classification Search
CPC ... H04L 9/3247; H04L 9/0825; H04L 9/3236; H04L 9/3263; H04L 2209/127; G06F 21/64
(Continued)

(56) References Cited

U.S. PATENT DOCUMENTS

2016/0098555 A1* 4/2016 Mersh .................... G06F 21/57
713/187
2020/0174995 A1* 6/2020 Fu .......................... G06F 21/64
(Continued)

FOREIGN PATENT DOCUMENTS

| CN | 101154256 A | 4/2008 |
| CN | 110321714 A | 10/2019 |

(Continued)

OTHER PUBLICATIONS

The International Search Report and Written Opinion of the International Searching Authority for International Application No. PCT/CN2022/102919 mailed on Sep. 20, 2022.

*Primary Examiner* — Bryan F Wright
(74) *Attorney, Agent, or Firm* — Womble Bond Dickinson (US) LLP

(57) ABSTRACT

Trusted measurement methods and trusted computing nodes for improving credibility of trusted platform control module (TPCM) are provided. The method comprises, after a measurement request is initiated, signing, by a first secure and trusted execution environment, the measurement request by using a private key of the first security certificate to obtain a measurement request data packet including a signature, and sending the measurement request data packet to a trusted measurement agent; forwarding, by the trusted mea-
(Continued)

surement agent, the measurement request data packet to a second secure and trusted execution environment; and performing, by the second secure and trusted execution environment, signature verification on the measurement request data packet by using a public key of the first security certificate, obtaining measurement data of a target protection object after the signature verification succeeds, signing the measurement data by using a private key of the second security certificate to obtain a measurement data packet including a signature, and sending the measurement data packet to the trusted measurement agent; and forwarding, by the agent, the measurement data packet to the TPCM, and performing, by the TPCM, signature verification on the measurement data packet by using a public key of the second security certificate, and performing trusted measurement on the target protection object based on the measurement data after the signature verification succeeds.

11 Claims, 2 Drawing Sheets

(58) Field of Classification Search
USPC .......................................................... 713/176
See application file for complete search history.

(56) References Cited

U.S. PATENT DOCUMENTS

| | | | |
|---|---|---|---|
| 2022/0006637 | A1* | 1/2022 | Nevis ..................... G06F 16/188 |
| 2022/0292203 | A1* | 9/2022 | Severns-Williams ........................ G06F 21/57 |

FOREIGN PATENT DOCUMENTS

| | | |
|---|---|---|
| CN | 112231652 A | 1/2021 |
| CN | 112948810 A | 6/2021 |
| CN | 113591159 A | 11/2021 |

* cited by examiner

COMPUTING DEVICES AND TRUSTED COMPUTING NODES FOR IMPROVING CREDIBILITY OF TRUSTED PLATFORM CONTROL MODULE

CROSS-RELATED APPLICATIONS

This application is a national stage entry of international application no. PCT/CN2022/102919 filed on Jun. 30, 2022, which claims priority to Chinese Application No. 202110876068.6 filed on Jul. 30, 2021, which is herein incorporated by reference in its entirety.

TECHNICAL FIELD

This specification relates to the field of computer technologies, and in particular, to trusted measurement methods and trusted computing nodes.

BACKGROUND

Trusted measurement is an important technology in trusted computing. In a trusted computing node architecture, code and data related to a target protection object are obtained by using a trusted measurement agent, and the obtained result is provided to a trusted platform control module (TPCM). The TPCM forwards the result to a trusted software base (TSB), and the TSB performs trusted measurement computing on the target protection object based on a measurement policy and the result to obtain a measurement result.

Currently, the trusted measurement agent runs in an operating system of a trusted computing node and belongs to a software part, and has poor security and is easy to be attacked. In addition, once the trusted measurement agent is attacked, the TPCM in the trusted computing node has credibility.

Therefore, it is urgent to propose a solution that can improve credibility of the TPCM.

SUMMARY

Embodiments of this specification provide trusted measurement methods and trusted computing nodes, to improve credibility of a TPCM.

To resolve the previous technical problem, the following technical solutions are used in embodiments of this specification. According to a first aspect, a trusted measurement method is proposed, applied to a trusted computing node. The trusted computing node includes a trusted measurement agent, a TPCM, a first secure and trusted execution environment, and a second secure and trusted execution environment. A first security certificate is preset in the first secure and trusted execution environment, a second security certificate is preset in the second secure and trusted execution environment, and the TPCM is located in the first secure and trusted execution environment. The method includes following: After the TPCM initiates a measurement request, the first secure and trusted execution environment signs measurement request data by using a private key of the first security certificate to obtain a measurement request data packet including a signature, and sends the measurement request data packet including a signature to the trusted measurement agent, where the measurement request is used to request to measure credibility of a target protection object; the trusted measurement agent forwards the measurement request data packet including a signature to the second secure and trusted execution environment; the second secure and trusted execution environment performs signature verification on the measurement request data packet including a signature by using a public key of the first security certificate, obtains measurement data of the target protection object after the signature verification succeeds, signs the measurement data by using a private key of the second security certificate to obtain a measurement data packet including a signature, and sends the measurement data packet including a signature to the trusted measurement agent; the trusted measurement agent forwards the measurement data packet including a signature to the TPCM; and the TPCM performs signature verification on the measurement data packet including a signature by using a public key of the second security certificate, and performs trusted measurement on the target protection object based on the measurement data after the signature verification succeeds.

According to a second aspect, a trusted computing node is proposed, including: a trusted measurement agent, a TPCM, a first secure and trusted execution environment, and a second secure and trusted execution environment. A first security certificate is preset in the first secure and trusted execution environment, a second security certificate is preset in the second secure and trusted execution environment, and the TPCM is located in the first secure and trusted execution environment. The TPCM is configured to initiate a measurement request, receive a measurement data packet including a signature, and perform trusted measurement on a target protection object based on measurement data in the measurement data packet after signature verification performed on the measurement data packet including a signature by using a public key of the second security certificate succeeds, where the measurement request is used to request to measure credibility of the target protection object. The trusted measurement agent is configured to forward a measurement request data packet including a signature to the second secure and trusted execution environment, and forward the measurement data packet including a signature to the TPCM. The first secure and trusted execution environment is configured to: after the TPCM initiates the measurement request, sign measurement request data by using a private key of the first security certificate to obtain the measurement request data packet including a signature, and send the measurement request data packet including a signature to the trusted measurement agent. The second secure and trusted execution environment is configured to: after signature verification performed on the measurement request data packet including a signature by using a public key of the first security certificate succeeds, obtain measurement data of the target protection object, sign the measurement data by using a private key of the second security certificate to obtain the measurement data packet including a signature, and send the measurement data packet including a signature to the trusted measurement agent.

According to at least one of the previous technical solutions provided in the embodiments of this specification, two secure and trusted execution environments are disposed in the trusted computing node; security certificates are respectively preset in the two secure and trusted execution environments to perform mutual signature authentication between the measurement request data packet and the measurement data packet, to ensure credibility of the measurement request and the measurement data; and the trusted measurement agent only performs a transparent data transmission function. As such, the trusted measurement agent can be excluded from a trusted computing base (TCB), and even if the trusted measurement agent is attacked, credibility of the TPCM is not affected. Therefore, credibility of the TPCM can be improved.

BRIEF DESCRIPTION OF DRAWINGS

The accompanying drawings described here are used to provide a further understanding of this specification, and constitute a part of this specification. Example embodiments of this specification and descriptions of the embodiments are used to explain this specification, and do not constitute an inappropriate limitation on this specification. In the accompanying drawings.

DESCRIPTION OF EMBODIMENTS

To make the objectives, technical solutions, and advantages of this specification clearer, the following clearly and comprehensively describes the technical solutions of this specification with reference to specific embodiments and accompanying drawings of this specification. Clearly, the described embodiments are merely some rather than all of the embodiments of this specification. All other embodiments obtained by a person of ordinary skill in the art based on the embodiments of this specification without creative efforts shall fall within the protection scope of this specification.

Figure 1:
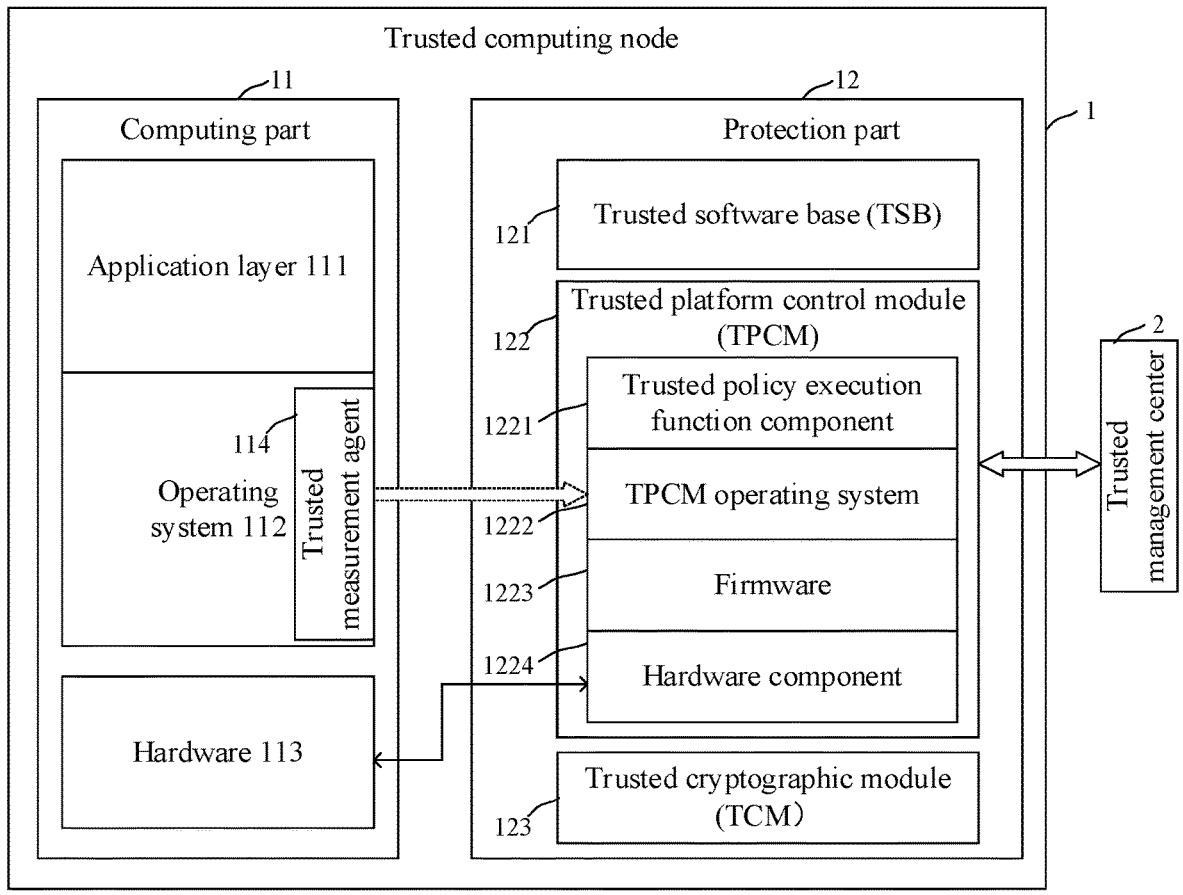
FIG. 1 is a diagram illustrating an architecture of a trusted computing node in a related technology.

FIG. 1 is a diagram illustrating an architecture of a trusted computing node in a related technology. As shown in FIG. 1, in a related technology, a trusted computing node 1 includes a computing part 11 and a protection part 12. The computing part 11 includes an application layer 111, an operating system (OS) 112, hardware 113, and a trusted measurement agent 114 running in the OS 112. The protection part 12 includes a trusted software base (TSB) 121, a trusted platform control module (TPCM) 122, and a trusted cryptographic module (TCM) 123. The TPCM 122 can include a trusted policy execution function component 1221, a TPCM OS 1222, firmware 1223, and a hardware component 1224.

As shown in FIG. 1, the TPCM 122 can interact remotely with a trusted management center 2.

In the trusted computing node 1 shown in FIG. 1, a trusted measurement process is roughly as follows: After the TPCM 122 initiates a measurement request, the trusted measurement agent 114 obtains related measurement data of a target protection object and provides the related measurement data to the TPCM 122. The TPCM 122 further forwards the obtained related measurement data to the TSB 121. The TSB 121 performs trusted measurement on the target protection object based on a measurement policy and the related measurement data of the target protection object.

It is worthwhile to note that, the TSB is embedded in host basic software, and is a set of all software elements that provide support for credibility of a computing platform. A trusted computing base (TCB) described below refers to an overall protection apparatus in a computer, and includes hardware, firmware, software, and a combination responsible for executing a security policy. The TCB establishes a basic protection environment and provides additional user services needed by a trusted computer system.

Figure 2:
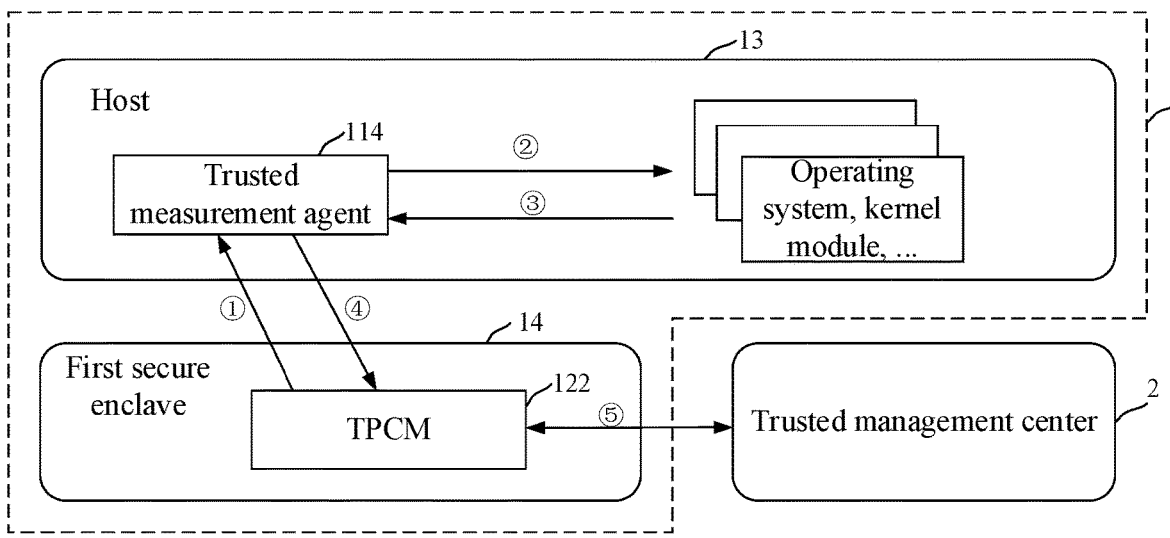
FIG. 2 is a schematic diagram illustrating a structure of a trusted computing node, according to one or more embodiments of this specification.

Based on FIG. 1, as shown in FIG. 2, one or more embodiments of this specification provide a trusted computing node 1, including a host 13, a TPCM 122, and a trusted measurement agent 114. The TPCM 122 is located in a first secure and trusted execution environment 14.

Still referring to FIG. 2, a trusted measurement process of the trusted computing node 1 can include the following steps: ① The TPCM 122 located in the first secure and trusted execution environment 14 initiates a measurement request and sends the measurement request to the trusted measurement agent 114. ② After receiving the measurement request, the trusted measurement agent 114 parses a measurement request data packet to determine a target protection object that requests measurement (the measurement request data packet includes an identifier of the target protection object, and the target protection object can be determined by using the identifier), and obtains related code and data of the target protection object, where the target protection object can be a segment of continuous address data in an OS or a kernel module, and the segment of continuous address data can include a start address and an end address, such as a system call table, an interrupt vector table, etc. of a Linux kernel. ③The OS, the kernel module, etc. returns the related code and data of the target protection object to the trusted measurement agent 114. ④ The trusted measurement agent 114 packages the related code and data of the target protection object and then sends a packaged data packet to the TPCM 122. The TPCM 122 performs measurement computing based on the data in the received data packet to obtain a measurement result, and compares the measurement result with a trusted reference value of the target protection object to determine credibility of the target protection object. Specifically, the TPCM 122 forwards the received data packet to the TSB, and the TSB performs measurement computing to obtain a measurement result, and compares the measurement result with the trusted reference value of the target protection object to determine credibility of the target protection object.

Optionally, as shown in FIG. 2, the trusted measurement process of the trusted computing node 1 can further include the following step: ⑤ The TPCM 122 receives a measurement policy delivered by a trusted management center 2, and/or feeds back the measurement result to the trusted management center 2, so that the trusted management center 2 performs remote attestation on credibility of the target protection object.

It is not difficult to see from FIG. 1 and FIG. 2 that, the trusted measurement agent 114 is a relatively fragile attack surface. The trusted measurement agent 114 is located in a kernel of an OS or user space, and is implemented by software only. Security protection of the trusted measurement agent 114 relies on a security protection mechanism of the OS. When the OS is maliciously attacked, the trusted measurement agent 114 is easily tampered with. After the trusted measurement agent 114 is tampered with, there is a possibility that measurement data such as the measurement request data packet and the obtained code are tampered with. As a result, a dynamic measurement result is no longer trustworthy, and it is difficult to detect an attack on the TPCM.

To resolve the previous problems, the embodiments of this specification attempt to find a dynamic trusted measurement solution in which the trusted measurement agent is excluded from the TCB, so that the trusted measurement agent no longer needs to be protected, and even if the trusted measurement agent is attacked, credibility of the TPCM is not affected. Fortunately, the embodiments of this specification find such a solution. For example, based on FIG. 2, a secure and trusted execution environment (a second secure and trusted execution environment bellow) is added, and measurement-related actions (for example, parsing the measurement request data packet and obtaining the measurement data such as the code of the target protection object) performed by the trusted measurement agent are transferred to the second secure and trusted execution environment for execution, to ensure that a measurement process is not attacked. Detailed descriptions are provided below.

Figure 3:
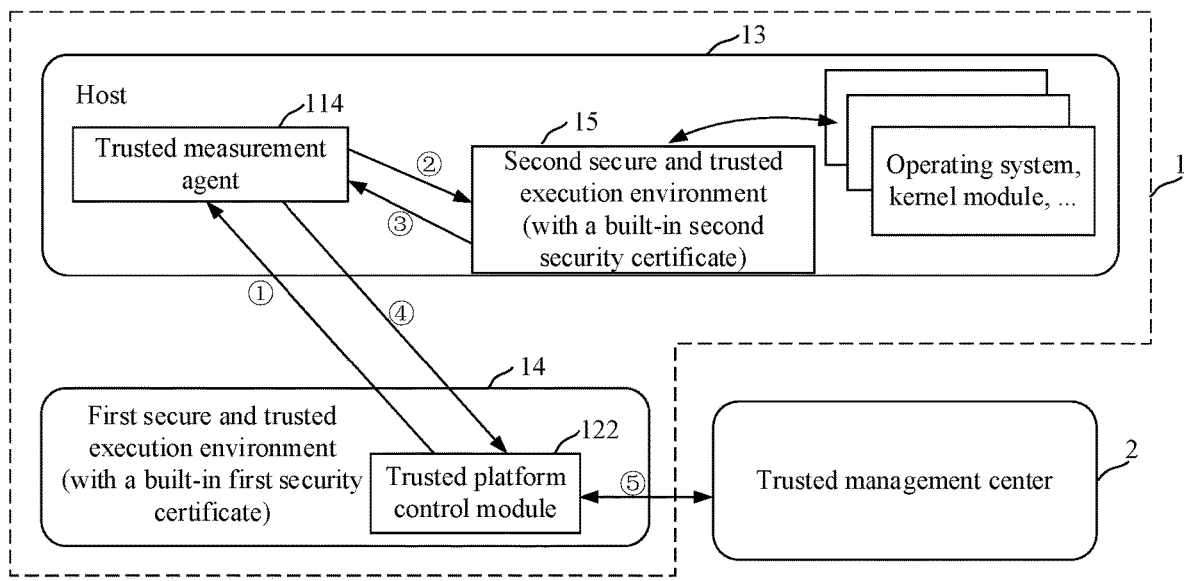
FIG. 3 is a schematic diagram illustrating a structure of a trusted computing node, according to other embodiments of this specification.

As shown in FIG. 3, one or more embodiments of this specification provide a trusted computing node 1. The trusted computing node 1 can include a trusted measurement agent 114, a TPCM 122, a first secure and trusted execution environment 14, and a second secure and trusted execution environment 15. A first security certificate is preset in the first secure and trusted execution environment 14, a second security certificate is preset in the second secure and trusted execution environment 15, and the TPCM 122 is located in the first secure and trusted execution environment 14.

In FIG. 3, a trusted measurement process can include the following steps: ① After the TPCM 122 initiates a measurement request, the first secure and trusted execution environment 14 signs measurement request data by using a private key of the first security certificate to obtain a measurement request data packet including a signature, and sends the measurement request data packet including a signature to the trusted measurement agent 114. ② The trusted measurement agent 114 forwards the measurement request data packet including a signature to the second secure and trusted execution environment 15 after receiving the measurement request data packet including a signature. ③ After signature verification performed on the measurement request data packet including a signature by using a public key of the first security certificate succeeds, the second secure and trusted execution environment 15 parses the measurement request data packet to determine a target protection object that requests measurement, obtains measurement data such as related code and data of the target protection object, signs the measurement data by using a private key of the second security certificate to obtain a measurement data packet including a signature, and sends the measurement data packet including a signature to the trusted measurement agent 114. ④ The trusted measurement agent 114 forwards the measurement data packet including a signature to the TPCM 122. After signature verification performed on the measurement data packet including a signature by using a public key of the second security certificate succeeds, the TPCM 122 performs trusted measurement on the target protection object based on the measurement data in the measurement data packet to obtain a measurement result, and compares the measurement result with a trusted reference value of the target protection object to determine credibility of the target protection object.

Optionally, as shown in FIG. 3, the trusted measurement process can further include the following step: ⑤ The TPCM 122 receives a measurement policy delivered by a trusted management center 2, and/or feeds back the measurement result to the trusted management center 2, so that the trusted management center 2 performs remote attestation on credibility of the target protection object. Certainly, content of the remote attestation may not be limited to the measurement result.

Correspondingly, functions of the modules in the trusted computing node 1 shown in FIG. 3 are as follows: The TPCM 122 is configured to initiate a measurement request, receive a measurement data packet including a signature, and perform trusted measurement on a target protection object based on measurement data in the measurement data packet after signature verification performed on the measurement data packet including a signature by using a public key of the second security certificate succeeds, where the measurement request is used to request to measure credibility of the target protection object.

The trusted measurement agent 114 is configured to forward a measurement request data packet including a signature to the second secure and trusted execution environment, and forward the measurement data packet including a signature to the TPCM.

The first secure and trusted execution environment 14 is configured to: after the TPCM initiates the measurement request, sign measurement request data by using a private key of the first security certificate to obtain the measurement request data packet including a signature, and send the measurement request data packet including a signature to the trusted measurement agent.

The second secure and trusted execution environment 15 is configured to: after signature verification performed on the measurement request data packet including a signature by using a public key of the first security certificate succeeds, obtain measurement data of the target protection object, sign the measurement data by using a private key of the second security certificate to obtain the measurement data packet including a signature, and send the measurement data packet including a signature to the trusted measurement agent.

The first secure and trusted execution environment 14 can be a secure enclave. The secure enclave can be located in the host 13, such as a card inserted into the host or a secure module located in a host CPU, and has a hardware security feature and a secure and trusted execution environment. Similar to the first secure and trusted execution environment 14, the second secure and trusted execution environment 15 can also be a secure enclave. The secure enclave can be located in the host 13, such as a card inserted into the host or a secure module located in the host CPU, and has a hardware security feature and a secure and trusted execution environment. When the second secure and trusted execution environment 15 is located in the host 13 of the trusted computing node 1, a communication distance between the trusted measurement agent 114 and the second secure and trusted execution environment 15 can be shortened, thereby saving communication time.

Similar to that in FIG. 2, the trusted measurement agent 114 is still located in an OS. However, the trusted measurement agent here is responsible for forwarding the measurement request data packet from the first secure and trusted execution environment 14 to the second secure and trusted execution environment 15, and forwarding the measurement data packet from the second secure and trusted execution environment 15 to the first secure and trusted execution environment 14, that is, responsible for a transparent data transmission function, and is not responsible for parsing the measurement request data packet and obtaining the measurement data. These two parts of work are transferred to the second secure and trusted execution environment 15.

The host 13 in FIG. 3 includes hardware of the second secure and trusted execution environment 15 and software such as an OS and the trusted measurement agent 114.

The first security certificate (cert1) and the second security certificate (cert2) can be delivered by a third-party certification authority, such as a certificate authority (CA) center. The private key corresponding to the first security certificate is located in the first secure and trusted execution environment, and is used to sign the measurement request data. The public key of the first security certificate is public to the second secure and trusted execution environment, and the public key is used by the second secure and trusted execution environment to perform signature verification on the measurement request data packet including a signature. Through signature verification, it can be determined whether the measurement request data packet is tampered with. The private key corresponding to the second security certificate is located in the second secure and trusted execution environment, and is used to sign the measurement data packet. The public key of the second security certificate is public to the first secure and trusted execution environment, and the public key is used by the first secure and trusted execution environment to perform signature verification on the measurement data packet including a signature. Through signature verification, it can be determined whether the measurement data packet is tampered with. Certainly, the first security certificate and the second security certificate can be further used to mutually authenticate other interaction data between the first secure and trusted execution environment and the second secure and trusted execution environment.

It can be understood that, in the trusted computing node shown in FIG. 3, two secure and trusted execution environments are disposed, and security certificates are respectively preset in the two secure and trusted execution environments, so that bidirectional authentication can be performed to perform mutual signature authentication between the measurement request and the measurement data acquisition result, to ensure credibility of the measurement request and the measurement data. As such, the measurement process is independent of strong credibility of the trusted measurement agent. If the trusted measurement agent is attacked, and a malicious attacker tampers with an address of the measurement request, the signature verification in the second secure and trusted execution environment fails. Similarly, if the measurement data is tampered with, the signature verification in the first secure and trusted execution environment also fails. It can be seen that, the trusted measurement agent only performs a transparent data transmission function, credibility of exchanged data is mutually verified by the two secure and trusted execution environments, and the trusted measurement agent is no longer a part of the TCB. Therefore, the TPCM is not affected by an attack on the trusted measurement agent, thereby improving credibility of the TPCM.

In addition, in the trusted computing node shown in FIG. 3, the TPCM performs trusted measurement on the target protection object based on the measurement data of the target protection object, so that the TSB can be simplified or even removed, thereby reducing implementation costs of the entire node.

Because the trusted computing node 1 shown in FIG. 3 includes two secure and trusted execution environments independent of each other, the trusted measurement solution provided in the embodiments of this specification can be considered as a trusted measurement solution based on an independent dual-system architecture.

Figure 4:
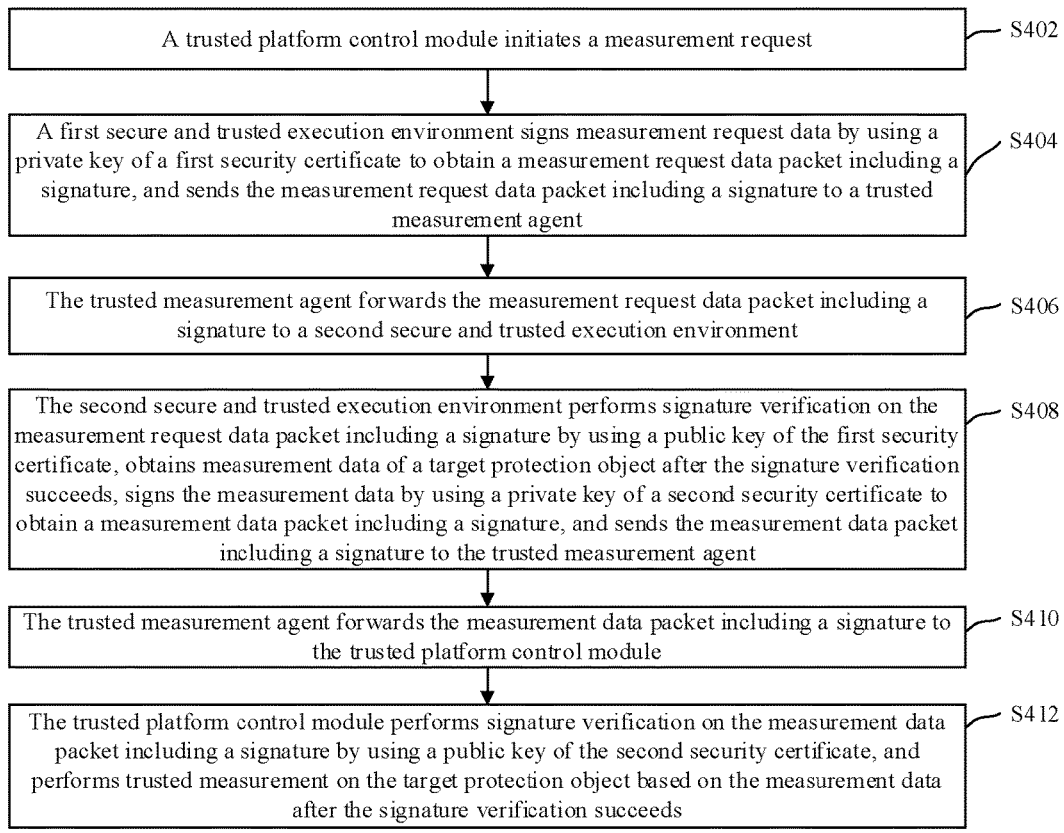
FIG. 4 is a schematic flowchart illustrating a trusted measurement method, according to one or more embodiments of this specification.

Based on the trusted computing node 1 shown in FIG. 3, as shown in FIG. 4, one or more embodiments of this specification provide a trusted measurement method. The method can be applied to the trusted computing node 1 shown in FIG. 3. The method can include the following steps.

Step 402: A TPCM initiates a measurement request.

The measurement request is used to request to measure credibility of a target protection object. The target protection object can be a segment of continuous address data in an OS or a kernel module, and the segment of continuous address data can include a start address and an end address, such as a system call table, an interrupt vector table, etc. of a Linux kernel.

Optionally, before step 402, the method shown in FIG. 4 can further include following: The TPCM receives a measurement policy delivered by a trusted management center, where the measurement policy includes but is not limited to at least one protection object, a trusted reference value of the at least one protection object, and a measurement occasion of the at least one protection object, and the following target protection object is one of the at least one protection object. The measurement occasion of the protection object can include a measurement periodicity (or a measurement time interval), first measurement time, etc.

Correspondingly, step 402 can include following: The TPCM initiates the measurement request based on the measurement occasion of the target protection object in the measurement policy.

Step 404: A first secure and trusted execution environment signs measurement request data by using a private key of a first security certificate to obtain a measurement request data packet including a signature, and sends the measurement request data packet including a signature to a trusted measurement agent.

Step 406: The trusted measurement agent forwards the measurement request data packet including a signature to a second secure and trusted execution environment.

Step 408: The second secure and trusted execution environment performs signature verification on the measurement request data packet including a signature by using a public key of the first security certificate, obtains measurement data of the target protection object after the signature verification succeeds, signs the measurement data by using a private key of a second security certificate to obtain a measurement data packet including a signature, and sends the measurement data packet including a signature to the trusted measurement agent.

After the signature verification performed on the measurement request data packet succeeds, the second secure and trusted execution environment parses the measurement request data packet to determine the target protection object that requests measurement, and then obtains the measurement data such as related code and data of the target protection object.

Step 410: The trusted measurement agent forwards the measurement data packet including a signature to the TPCM.

Step 412: The TPCM performs signature verification on the measurement data packet including a signature by using a public key of the second security certificate, and performs trusted measurement on the target protection object based on the measurement data after the signature verification succeeds.

Optionally, the method shown in FIG. 4 can further include following: The TPCM compares a trusted measurement result of the target protection object with a trusted reference value of the target protection object to determine whether the target protection object is trustworthy.

Optionally, the method shown in FIG. 4 can further include following: When the target protection object is not trustworthy, the TPCM processes the untrustworthy case by taking predetermined measures, where the predetermined measures include at least one of the following: powering off, disconnecting a network, giving an alarm, and giving a report to a trusted management center. As such, the untrustworthy case is processed in time, to avoid affecting trusted computing of the trusted computing node.

Optionally, the method shown in FIG. 4 can further include following: The TPCM sends a trusted measurement result to a trusted management center, so that the trusted management center remotely attests credibility of the target protection object based on a trusted reference value of the target protection object and the trusted measurement result.

It is worthwhile to note that, in the one or more embodiments of this specification, the action performed by the first secure and trusted execution environment can be specifically executed by an executor such as firmware in the first secure and trusted execution environment. Similarly, the action performed by the second secure and trusted execution environment can be specifically executed by an executor such as firmware in the second secure and trusted execution environment.

According to the trusted measurement method provided in the one or more embodiments shown in FIG. 4, the second secure and trusted execution environment set in the trusted computing node parses the measurement request data packet and obtains the measurement data, and mutual authentication of exchanged data is implemented by using the security certificates set in the first secure and trusted execution environment and the second secure and trusted execution environment. The trusted measurement agent only performs a transparent data transmission function, and the trusted measurement agent is excluded from a TCB. Therefore, even if the trusted measurement agent is attacked, credibility of the TPCM is not affected, thereby improving credibility of the TPCM.

Specific embodiments of this specification are described above. Other embodiments fall within the scope of the appended claims. In some cases, the actions or steps described in the claims can be performed in an order different from that in the embodiments, and the desired results can still be achieved. In addition, the processes described in the accompanying drawings do not necessarily need a specific order or a sequential order shown to achieve the desired results. In some implementations, multi-tasking and parallel processing are feasible or may be advantageous.

The embodiments of this specification are described in a progressive way. For the same or similar parts of the embodiments, mutual references can be made between the embodiments. Each embodiment focuses on a difference from other embodiments. Particularly, the apparatus embodiments are basically similar to the method embodiments, and therefore are described briefly. For related parts, references can be made to related descriptions in the method embodiments.

In conclusion, the previous descriptions are merely example embodiments of this specification, and are not intended to limit the protection scope of this specification. Any modification, equivalent replacement, improvement, etc. made within the spirit and principle of one or more embodiments of this specification shall fall within the protection scope of the one or more embodiments of this specification.

The system, apparatus, module, or unit illustrated in the previous embodiments can be specifically implemented by a computer chip or an entity, or can be implemented by a product having a certain function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

The computer-readable medium includes persistent and non-persistent, removable and non-removable media, which can store information by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in this specification, the computer-readable medium does not include a transitory computer-readable medium, for example, a modulated data signal and carrier.

It is worthwhile to further note that, the terms "include", "comprise", or their any other variants are intended to cover a non-exclusive inclusion, so a process, a method, a product, or a device that includes a list of elements not only includes those elements but also includes other elements that are not expressly listed, or further includes elements inherent to such a process, method, product, or device. Without more constraints, an element preceded by "includes a . . . " does not preclude the existence of additional identical elements in the process, method, product, or device that includes the element.

The embodiments of this specification are described in a progressive way. For the same or similar parts of the embodiments, mutual references can be made between the embodiments. Each embodiment focuses on a difference from other embodiments. Particularly, the system embodiments are basically similar to the method embodiments, and therefore are described briefly. For related parts, references can be made to the related descriptions in the method embodiments.

What is claimed is:

1. A measurement method, applied to a trusted computing node, wherein the trusted computing node comprises a trusted measurement agent, a trusted platform control module (TPCM), a first secure and trusted execution environment, and a second secure and trusted execution environment, a first security certificate is preset in the first secure and trusted execution environment, a second security certificate is preset in the second secure and trusted execution environment, and the TPCM is located in the first secure and trusted execution environment, and the method comprises:
after the TPCM initiates a measurement request, signing, by the first secure and trusted execution environment, measurement request data by using a private key of the first security certificate to obtain a measurement request data packet comprising a signature, and sending the measurement request data packet comprising a signature to the trusted measurement agent, wherein the measurement request is used to request to measure credibility of a target protection object;

forwarding, by the trusted measurement agent, the measurement request data packet comprising a signature to the second secure and trusted execution environment;

performing, by the second secure and trusted execution environment, signature verification on the measurement request data packet comprising a signature by using a public key of the first security certificate, obtaining measurement data of the target protection object after the signature verification succeeds, signing the measurement data by using a private key of the second security certificate to obtain a measurement data packet comprising a signature, and sending the measurement data packet comprising a signature to the trusted measurement agent;

forwarding, by the trusted measurement agent, the measurement data packet comprising a signature to the TPCM; and performing, by the TPCM, signature verification on the measurement data packet comprising a signature by using a public key of the second security certificate, and performing trusted measurement on the target protection object based on the measurement data after the signature verification succeeds.

2. The method according to claim 1, wherein
the first secure and trusted execution environment is a first secure enclave; and
the second secure and trusted execution environment is a second secure enclave.

3. The method according to claim 1, wherein
the second secure and trusted execution environment is located in a host of the trusted computing node.

4. The method according to claim 1, before the TPCM initiates the measurement request, further comprising:
receiving, by the TPCM, a measurement policy delivered by a trusted management center, wherein the measurement policy comprises at least one protection object, a trusted reference value of the at least one protection object, and a measurement occasion of the at least one protection object, and the target protection object is one of the at least one protection object.

5. The method according to claim 4, further comprising:
initiating, by the TPCM, the measurement request based on the measurement occasion of the target protection object in the measurement policy.

6. The method according to claim 1, wherein the performing trusted measurement on the target protection object based on the measurement data comprises:
determining a hash value of the measurement data; and
using the hash value as a trusted measurement result of the target protection object.

7. The method according to claim 6, further comprising:
comparing the trusted measurement result of the target protection object with a trusted reference value of the target protection object to determine whether the target protection object is trustworthy.

8. The method according to claim 7, further comprising:
upon determining that the target protection object is not trustworthy, processing, by the TPCM, the untrustworthy case by taking predetermined measures, wherein the predetermined measures comprise at least one of the following: powering off, disconnecting a network, giving an alarm, and giving a report to a trusted management center.

9. The method according to claim 6, further comprising:
signing, by the TPCM, the trusted measurement result by using the private key of the first security certificate to obtain a measurement result data packet comprising a signature, and sending the measurement result data packet comprising a signature to a trusted management center, so that the trusted management center remotely attests credibility of the target protection object based on a trusted reference value of the target protection object and the trusted measurement result.

10. A trusted computing node, comprising a trusted measurement agent, a TPCM, a first secure and trusted execution environment, and a second secure and trusted execution environment, wherein a first security certificate is preset in the first secure and trusted execution environment, a second security certificate is preset in the second secure and trusted execution environment, and the TPCM is located in the first secure and trusted execution environment, the trusted computing node comprising a memory and a processor, wherein the memory stores executable instructions that, in response to execution by the processor, cause the trusted measurement agent to:
via the TPCM, initiate a measurement request, receive a measurement data packet comprising a signature, and perform trusted measurement on a target protection object based on measurement data in the measurement data packet after signature verification performed on the measurement data packet comprising a signature by using a public key of the second security certificate succeeds, wherein the measurement request is used to request to measure credibility of the target protection object;

via the trusted measurement agent, forward a measurement request data packet comprising a signature to the second secure and trusted execution environment, and forward the measurement data packet comprising a signature to the TPCM;

via the first secure and trusted execution environment, after the TPCM initiates the measurement request, sign measurement request data by using a private key of the first security certificate to obtain the measurement request data packet comprising a signature, and send the measurement request data packet comprising a signature to the trusted measurement agent; and via the second secure and trusted execution environment, after signature verification performed on the measurement request data packet comprising a signature by using a public key of the first security certificate succeeds, obtain measurement data of the target protection object, sign the measurement data by using a private key of the second security certificate to obtain the measurement data packet comprising a signature, and send the measurement data packet comprising a signature to the trusted measurement agent.

11. A computing device comprising a trusted measurement agent, a TPCM, a first secure and trusted execution environment, and a second secure and trusted execution environment, wherein a first security certificate is preset in the first secure and trusted execution environment, a second security certificate is preset in the second secure and trusted execution environment, and the TPCM is located in the first secure and trusted execution environment, the computing device comprising a memory and a processor, wherein the memory stores executable instructions that, in response to execution by the processor, cause the processor to:
initiate a measurement request, receive a measurement data packet comprising a signature, and perform trusted measurement on a target protection object based on measurement data in the measurement data packet after signature verification performed on the measurement data packet comprising a signature by using a public key of the second security certificate succeeds, wherein the measurement request is used to request to measure credibility of the target protection object;

forward a measurement request data packet comprising a signature to the second secure and trusted execution environment, and forward the measurement data packet comprising a signature to the TPCM;

after the TPCM initiates the measurement request, sign measurement request data by using a private key of the first security certificate to obtain the measurement request data packet comprising a signature, and send the measurement request data packet comprising a signature to the trusted measurement agent; and after signature verification performed on the measurement request data packet comprising a signature by using a public key of the first security certificate succeeds, obtain measurement data of the target protection object, sign the measurement data by using a private key of the second security certificate to obtain the measurement data packet comprising a signature, and send the measurement data packet comprising a signature to the trusted measurement agent.

* * * * *